US012759067B2

(12) United States Patent
Alecu et al.

(10) Patent No.: US 12,759,067 B2
(45) Date of Patent: Oct. 13, 2026

(54) SYSTEM AND METHOD FOR FORMING A NOZZLE INLET OF A NOZZLE

(71) Applicant: Pratt & Whitney Canada Corp., Longueuil (CA)

(72) Inventors: Daniel Alecu, Brampton (CA); Laslo T. Diosady, Etobicoke (CA)

(73) Assignee: Pratt & Whitney Canada Corp., Longueuil (CA)

( * ) Notice: Subject to any disclaimer, the term of this patent is extended or adjusted under 35 U.S.C. 154(b) by 813 days.

(21) Appl. No.: 17/971,108

(22) Filed: Oct. 21, 2022

(65) Prior Publication Data

US 2024/0131607 A1 Apr. 25, 2024
US 2024/0227050 A9 Jul. 11, 2024

(51) Int. Cl.
*B23H 9/10* (2006.01)
*B23H 3/10* (2006.01)
*B23H 9/16* (2006.01)

(52) U.S. Cl.
CPC ................. *B23H 9/10* (2013.01); *B23H 3/10* (2013.01); *B23H 9/16* (2013.01)

(58) Field of Classification Search
None
See application file for complete search history.

(56) References Cited

U.S. PATENT DOCUMENTS

| | | | | |
|---|---|---|---|---|
| 5,026,462 A | | 6/1991 | Butterfield | |
| 6,045,058 A | | 4/2000 | Dobbeling | |
| 6,254,347 B1 | * | 7/2001 | Shaw | B23H 9/10 416/97 R |
| 6,264,822 B1 | | 7/2001 | Wei | |
| 8,313,636 B2 | | 11/2012 | Arnold | |
| 8,906,221 B2 | | 12/2014 | Holmes | |
| 9,162,301 B2 | | 10/2015 | Holmes | |
| 10,413,983 B2 | | 9/2019 | Lynch | |
| 2018/0297137 A1 | * | 10/2018 | Hoskin | B23H 9/14 |
| 2019/0299309 A1 | * | 10/2019 | Yang | B23H 11/00 |
| 2022/0364727 A1 | * | 11/2022 | Rudrapatna | F23R 3/005 |
| 2023/0347434 A1 | | 11/2023 | Garner | |

(Continued)

FOREIGN PATENT DOCUMENTS

| | | |
|---|---|---|
| CN | 105829001 B | 5/2019 |
| DE | 202021001175 U1 | 6/2021 |
| WO | 2023209371 A2 | 11/2023 |

OTHER PUBLICATIONS

English translation EP 0989298 (Year: 2000).*

*Primary Examiner* — Stefanie S Wittenberg
(74) *Attorney, Agent, or Firm* — Getz Balich LLC

(57) ABSTRACT

A system for forming a nozzle inlet of a nozzle includes a nozzle body and an electro-chemical machining (ECM) assembly. The nozzle body includes an external surface. The nozzle body forms a nozzle orifice and a manifold passage. The nozzle orifice extends through the nozzle body between and to a nozzle inlet and a nozzle outlet. The nozzle inlet is disposed at the manifold passage. The nozzle outlet is disposed at the external surface. The ECM assembly is installed on the nozzle body. The ECM assembly includes a machining tool and a flexible line. The machining tool is disposed at the nozzle inlet. The flexible line is attached to the machining tool. The flexible line extends through the nozzle outlet from the machining tool to an exterior of the nozzle body.

17 Claims, 8 Drawing Sheets

(56) References Cited

U.S. PATENT DOCUMENTS

| | | | |
|---|---|---|---|
| 2023/0347435 | A1 | 11/2023 | Garner |
| 2023/0407516 | A1 | 12/2023 | Trimmer |
| 2024/0131607 | A1 | 4/2024 | Alecu |
| 2024/0253141 | A1 | 8/2024 | Holroyd |

* cited by examiner

SYSTEM AND METHOD FOR FORMING A NOZZLE INLET OF A NOZZLE

TECHNICAL FIELD

This disclosure relates generally to fluid nozzles for rotating equipment and, more particularly, to systems and methods for forming a nozzle inlet of a fluid nozzles.

BACKGROUND OF THE ART

Rotational equipment such as a gas turbine engine may include large quantities of fluid nozzles, such as lubricant nozzles. These lubricant nozzles may be used for directing lubricant to various rotating equipment assemblies. Various systems and methods are known in the art for forming fluid nozzles. While these known systems and methods have various advantages, there is still room in the art for improvement. There is a need in the art, therefore, for improved systems and methods for forming fluid nozzles.

SUMMARY

It should be understood that any or all of the features or embodiments described herein can be used or combined in any combination with each and every other feature or embodiment described herein unless expressly noted otherwise.

According to an aspect of the present disclosure, a system for forming a nozzle inlet of a nozzle includes a nozzle body and an electro-chemical machining (ECM) assembly. The nozzle body includes an external surface. The nozzle body forms a nozzle orifice and a manifold passage. The nozzle orifice extends through the nozzle body between and to a nozzle inlet and a nozzle outlet. The nozzle inlet is disposed at the manifold passage. The nozzle outlet is disposed at the external surface. The ECM assembly is installed on the nozzle body. The ECM assembly includes a machining tool and a flexible line. The machining tool is disposed at the nozzle inlet. The flexible line is attached to the machining tool. The flexible line extends through the nozzle outlet from the machining tool to an exterior of the nozzle body.

In any of the aspects or embodiments described above and herein, the ECM assembly may further include an electrolyte supply assembly. The electrolyte supply assembly may be engaged with the external surface at the nozzle outlet. The electrolyte supply assembly may be configured to direct an electrolyte into the nozzle orifice at the nozzle inlet.

In any of the aspects or embodiments described above and herein, the electrolyte supply assembly may further include an electrolyte nozzle engaged with the external surface at the nozzle outlet. The flexible line may extend through the electrolyte nozzle.

In any of the aspects or embodiments described above and herein, the ECM assembly may further include a power supply. The power supply may be electrically connected to the machining tool.

In any of the aspects or embodiments described above and herein, the machining tool may include a tool body extending between and to a first end and a second end. The tool body may form a tapered profile at the first end. The tapered profile may be positioned at the nozzle inlet.

In any of the aspects or embodiments described above and herein, the tool body may form a center passage extending through the tool body from the first end to the second end.

In any of the aspects or embodiments described above and herein, the nozzle body may form an edge at the nozzle inlet. The edge may extend circumferentially about the nozzle orifice at the nozzle inlet.

In any of the aspects or embodiments described above and herein, the nozzle orifice may extend orthogonally relative to the manifold passage.

According to another aspect of the present disclosure, a method for forming a nozzle inlet of a nozzle includes: providing a nozzle body including an external surface, the nozzle body forming a manifold passage; forming a nozzle aperture extending through the nozzle body between and to a nozzle inlet and a nozzle outlet, the nozzle inlet disposed at the manifold passage, the nozzle outlet disposed at the external surface, forming the nozzle aperture including forming an edge of the nozzle body at the nozzle inlet; positioning a machining tool of an electro-chemical machining (ECM) assembly at the nozzle inlet; and forming the nozzle inlet by removing the edge with the machining tool.

In any of the aspects or embodiments described above and herein, forming the nozzle inlet may include forming a fillet of the nozzle body at the nozzle inlet. The fillet may extend circumferentially about the nozzle inlet.

In any of the aspects or embodiments described above and herein, forming the nozzle inlet may include directing an electrolyte through the nozzle inlet and applying an electrical current through the nozzle body, the electrolyte, and the machining tool while directing the electrolyte through the nozzle inlet.

In any of the aspects or embodiments described above and herein, forming the nozzle inlet may further include directing the electrolyte through the nozzle inlet and applying the electrical current until the electrical current exceeds a predetermined electrical current threshold value.

In any of the aspects or embodiments described above and herein, positioning the machining tool may include attaching the machining tool to a flexible line and pulling the flexible line through the nozzle orifice to position the machining tool at the nozzle inlet.

In any of the aspects or embodiments described above and herein, positioning the machining tool may include inserting the flexible line into an open end of the manifold passage after attaching the machining tool to the flexible line and before pulling the flexible line through the nozzle orifice.

In any of the aspects or embodiments described above and herein, forming the nozzle aperture may include drilling the nozzle orifice through the nozzle body in a direction from the nozzle outlet to the nozzle inlet.

According to another aspect of the present disclosure, an electro-chemical machining (ECM) assembly for forming a nozzle inlet of a nozzle includes a machining tool, a power supply, a flexible line, and an electrolyte supply assembly. The machining tool includes a tool body. The power supply is electrically connected to the tool body by a wire. The flexible line is fixedly attached to the tool body. The electrolyte assembly is configured to direct an electrolyte to the machining tool.

In any of the aspects or embodiments described above and herein, the tool body may extend between and to a first end and a second end. The tool body may form a tapered profile at the first end.

In any of the aspects or embodiments described above and herein, the tool body may form a center passage extending through the tool body from the first end to the second end.

In any of the aspects or embodiments described above and herein, the electrolyte supply assembly may include an electrolyte supply, an electrolyte pump, and an electrolyte nozzle. The electrolyte pump may be configured to draw the electrolyte from the electrolyte supply and direct the electrolyte through the electrolyte nozzle.

In any of the aspects or embodiments described above and herein, the ECM assembly may further include a controller in signal communication with the electrolyte pump and the power supply. The controller may include a processor in communication with a non-transitory memory storing instructions, which instructions when executed by the processor, may cause the processor to: control the power supply to direct an electrical current through the machining tool and the electrolyte and identify a completion status for an ECM process by comparing the electrical current to a predetermined electrical current threshold value.

The present disclosure, and all its aspects, embodiments and advantages associated therewith will become more readily apparent in view of the detailed description provided below, including the accompanying drawings.

DETAILED DESCRIPTION

Figure 1:
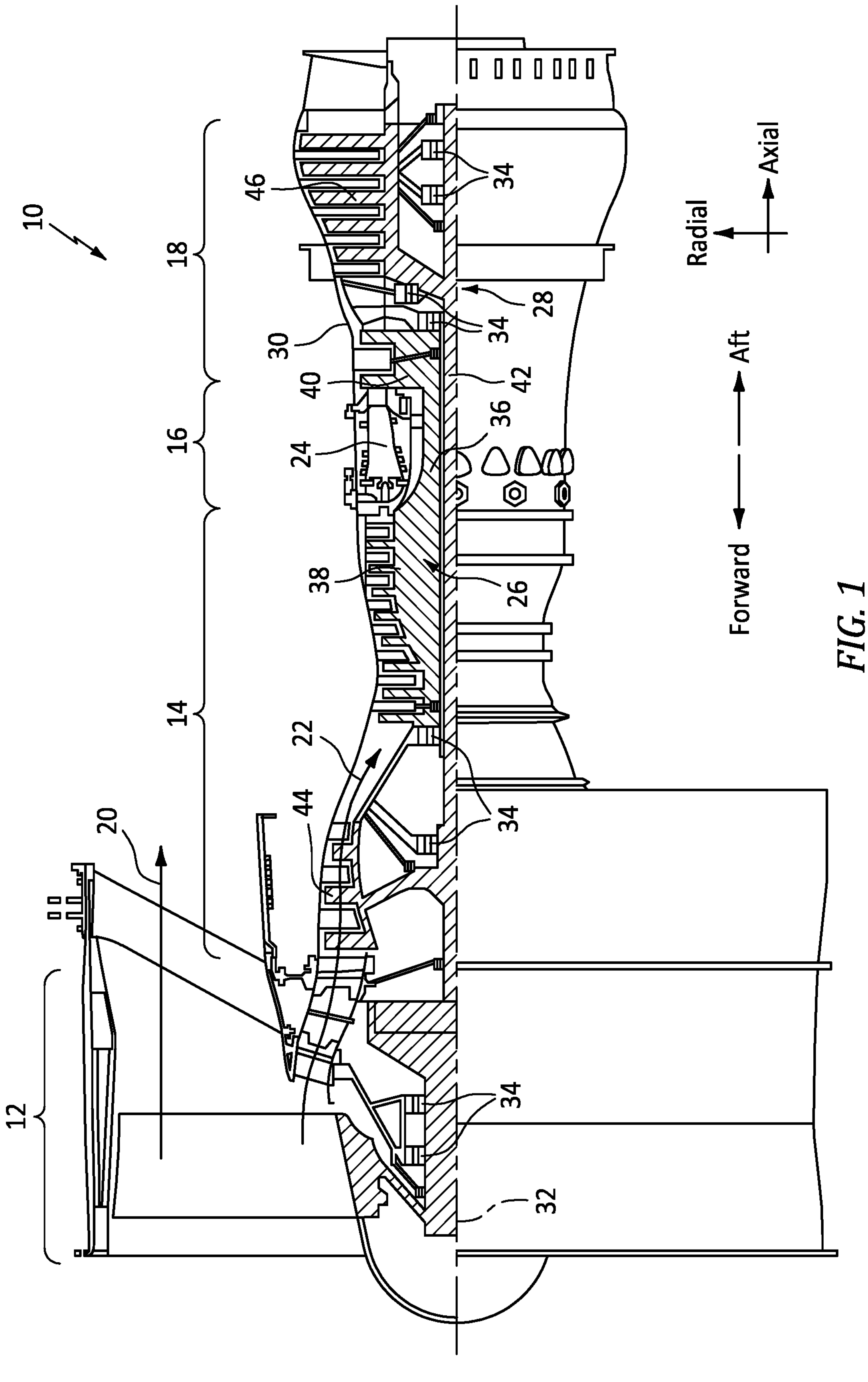
FIG. 1 illustrates a schematic cutaway of a gas turbine engine for an aircraft propulsion system, in accordance with one or more embodiments of the present disclosure.

FIG. 1 schematically illustrates a gas turbine engine 10. The gas turbine engine 10 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine of FIG. 1 includes a fan section 12, a compressor section 14, a combustor section 16, and a turbine section 18. The fan section 12 drives air along a bypass flow path 20 while the compressor section 14 drives air along a core flow path 22 for compression and communication into the combustor section 16 and then expansion through the turbine section 18. The compressor section 14 of FIG. 1 includes a low-pressure compressor 14A and a high-pressure compressor 14B downstream of the low-pressure compressor 14A. The turbine section 18 of FIG. 1 includes a high-pressure turbine (HPT) 18A and a low-pressure turbine (LPT) 18B downstream of the high-pressure turbine 18A. The combustor section 16 of FIG. 1 includes an annular combustor 24 disposed between the high-pressure compressor 14B and the high-pressure turbine 18A along the core flow path 22.

The gas turbine engine 10 of FIG. 1 includes a first rotational assembly 26 (e.g., a high-pressure spool), a second rotational assembly 28 (e.g., a low-pressure spool), and an engine static structure 30 (e.g., an engine case, a bearing compartment case, etc.). The first rotational assembly 26 and the second rotational assembly 28 are mounted for rotation about an axial centerline 32 (e.g., a rotational axis) of the gas turbine engine 10 relative to the engine static structure 30. The first rotational assembly 26 and the second rotational assembly 28 may be rotatably supported by one or more bearing systems 34. It should be understood that bearing systems, such as the bearing systems 34 of FIG. 1, may be provided at various additional or alternative locations of the gas turbine engine 10.

The first rotational assembly 26 of FIG. 1 includes a first shaft 36, a bladed first compressor rotor 38 for the high-pressure compressor 14B, and a bladed first turbine rotor 40 for the high-pressure turbine 18A. The first shaft 36 interconnects the bladed first compressor rotor 38 and the bladed first turbine rotor 40. The second rotational assembly 28 of FIG. 1 includes a second shaft 42, a bladed second compressor rotor 44 for the low-pressure compressor 14A, and a bladed second turbine rotor 46 for the low-pressure turbine 18B. The second shaft 42 interconnects the bladed second compressor rotor 44 and the bladed second turbine rotor 46. In operation, airflow along the core flow path 22 is compressed by the bladed second compressor rotor 44 and the bladed first compressor rotor 38, mixed and burned with fuel in the combustor 24, and then expanded across the bladed first turbine rotor 40 and the bladed second turbine rotor 46. The bladed first turbine rotor 40 and the bladed second turbine rotor 46 rotationally drive the first rotational assembly 26 and the second rotational assembly 28, respectively, in response to the expansion of the combustion gases. The first shaft 36 and the second shaft 42 are concentric and rotate via the one or more bearing systems 34 about the axial centerline 32, which axial centerline 32 is collinear with respective rotational axes of the first shaft 36 and the second shaft 42.

Figure 2:
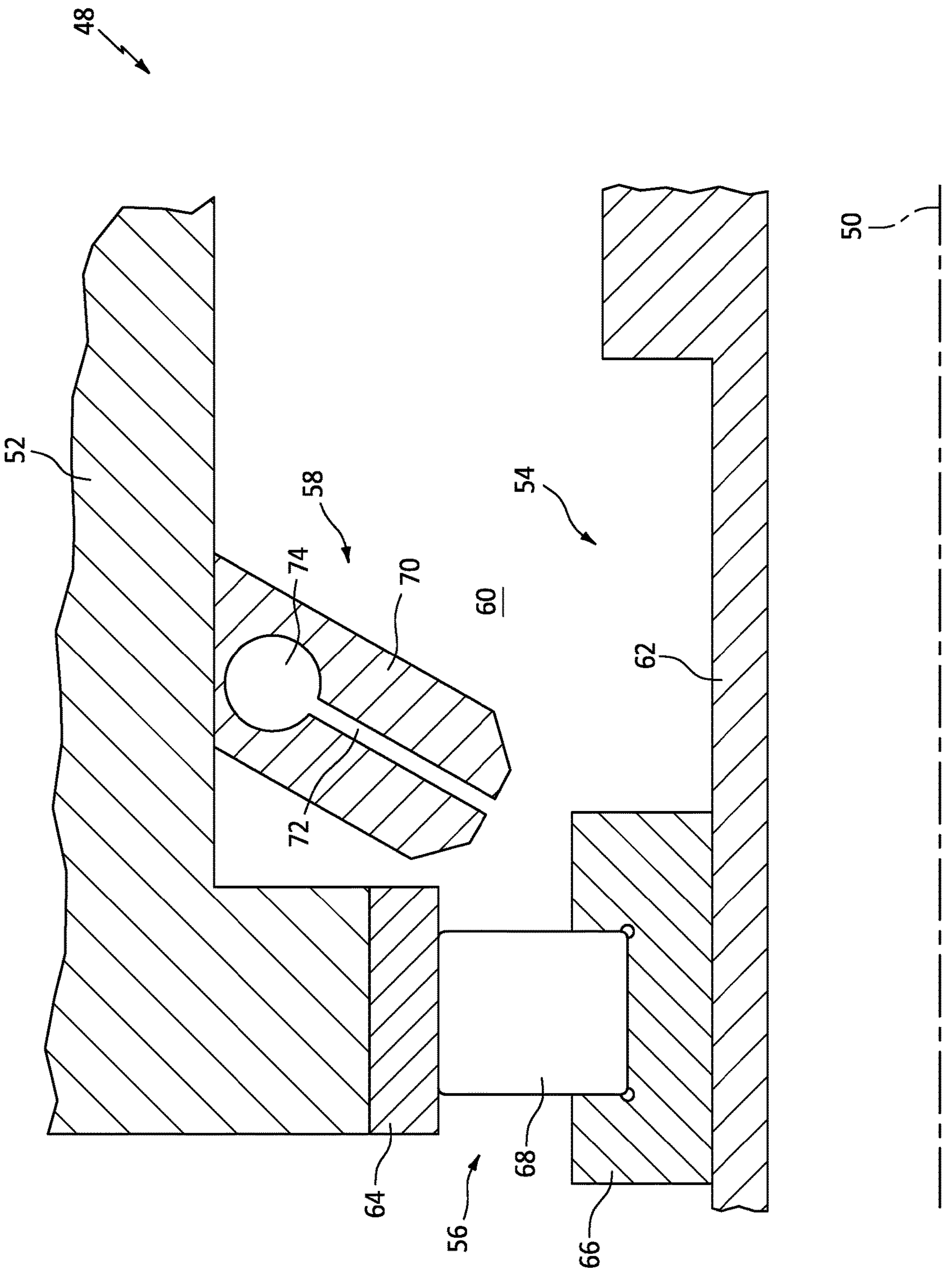
FIG. 2 illustrates a side, cutaway view of a rotational equipment assembly, in accordance with one or more embodiments of the present disclosure.

FIG. 2 illustrates an assembly 48 for rotational equipment with an axial centerline 50. The axial centerline 50 may also be an axis of rotation (e.g., a rotational axis) for one or more components of the rotational equipment assembly 48. An example of such rotational equipment includes the first rotational assembly 26, the second rotational assembly 28, and/or the bearing systems 34 of the gas turbine engine 10 FIG. 1. However, the rotational equipment assembly 48 is not limited to use with aircraft or gas turbine engine (e.g., the gas turbine engine 10) applications. The rotational equipment assembly 48 may alternatively be configured with rotational equipment such as an industrial gas turbine engine, a wind turbine, a water turbine, or any other apparatus in which a fluid (e.g., a lubricant) may be distributed by a fluid injection assembly.

The rotational equipment assembly 48 of FIG. 2 includes a static structure 52 (e.g., the engine static structure 30 of FIG. 1), a rotatable assembly 54, a bearing 56 (e.g., a bearing of the one or more bearings systems 34 of FIG. 1) for rotatably supporting the rotatable assembly 54 relative to the static structure 52, and a fluid injection assembly 58 (e.g., a lubricant injection assembly).

The static structure 52 is configured as a stationary part of the rotational equipment. The static structure 52 of FIG. 2, for example, is configured to at least partially form an internal bearing compartment 60 for housing the at least one bearing 56. The static structure 52 may be formed by a case (e.g., an engine case), a frame (e.g., a mid-turbine frame), or other fixed structural body of the associated rotational equipment.

The rotatable assembly 54 of FIG. 2 includes a rotatable base structure 62. The rotatable base structure 62 of FIG. 2 is configured as a tubular shaft. However, in other embodiments, the rotatable base structure 62 may be configured as another component (e.g., a sleeve) mounted to and rotatable with a shaft of the rotational equipment, or any other rotor within the rotational equipment. The rotatable base structure 62 of FIG. 2 extends axially along the axial centerline 50 through (or partially into or within) the static structure 52. The static structure 52 of FIG. 2 may, therefore, extend circumferentially about (e.g., completely around) the axial centerline 50 and the rotatable assembly 54. The rotatable assembly 54 may include one or more additional rotatable bodies such as, but not limited to, an oil scoop, a shaft spacer, or an axial retention member (e.g., a threaded nut). The rotatable assembly 54 and its rotatable base structure 62 are each configured to rotate about a common rotational axis which, in the embodiment of FIG. 2, is the axial centerline 50.

The bearing 56 may be configured as a roller element bearing. The bearing 56 of FIG. 2, for example, includes an annular outer race 64, an annular inner race 66, and a plurality of bearing elements 68 (e.g., cylindrical or spherical elements). The outer race 64 circumscribes the inner race 66 and the bearing elements 68. The outer race 64 is mounted to the static structure 52. The inner race 66 circumscribes and is mounted to the rotatable base structure 62. The bearing elements 68 are arranged in an annular array about the axial centerline 50, which array is radially between and engaged with (e.g., contacts) the outer race 64 and the inner race 66. The present disclosure, however, is not limited to the foregoing exemplary bearing configuration. For example, in some other embodiments, the bearing 56 may alternatively be configured as a journal bearing or any other type of bearing which may be used in the rotational equipment.

The fluid injection assembly 58 is arranged radially outboard of the rotatable assembly 54. The fluid injector 58 is configured to inject fluid (e.g., lubricant) into the bearing compartment 60 to provide the fluid to one or more other components of the rotational equipment such as, but not limited to, the rotatable assembly 54 and/or the bearing 56. The fluid injector 58 includes one or more nozzles 70 (one visible in FIG. 2). The one or more nozzles 70 may be arranged as an annular array about the axial centerline 50. Each nozzle 70 may include one or more nozzle orifices 72. The nozzle orifices 72 may be fluidly coupled with and, thus, supplied with the fluid (e.g., lubricant) from a manifold passage 74 (e.g., a common internal passage) within the fluid injection assembly 58. The nozzle orifices 72 are configured to direct a fluid stream (e.g., a lubricant stream) out of the fluid injection assembly 58, into the bearing compartment 60 or another space, and to the rotatable assembly 54 and/or the bearing 56. The nozzle orifices 72 may be further configured to direct the fluid stream to one or more other components within the bearing compartment 60.

Figure 3:
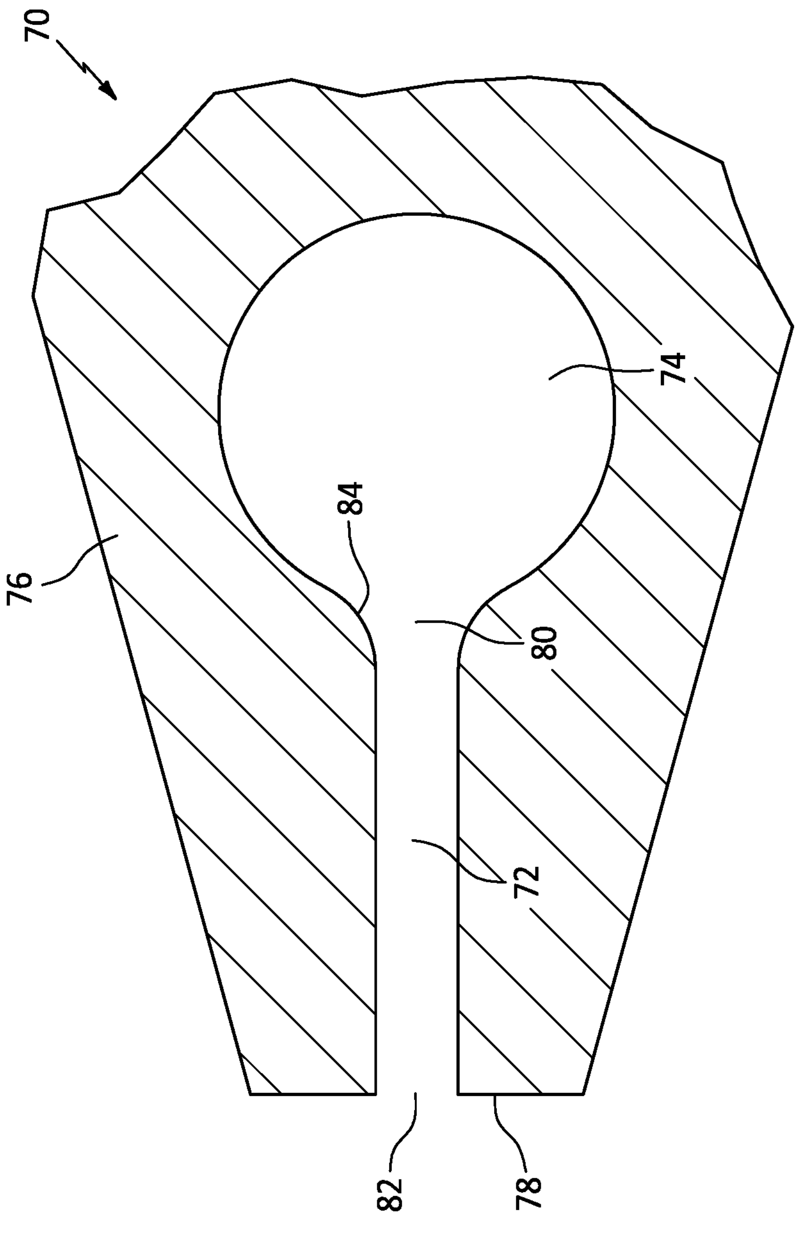
FIG. 3 illustrates a side, cutaway view of a nozzle, in accordance with one or more embodiments of the present disclosure.

FIG. 3 illustrates a cutaway view of one of said nozzles 70 of the fluid injector assembly 58. The nozzle 70 of FIG. 3 includes a nozzle body 76. The nozzle body 76 includes a body material. The body material may include or be formed from a metal material such as, but not limited to, an alloy steel, titanium, a nickel-based alloy, a WASPALOY® material, an INCONEL® material, or the like. The nozzle body 76 of FIG. 3 forms the nozzle orifice 72 and the manifold passage 74 (e.g., a portion of the manifold passage 74 of the fluid injection assembly 58) for the nozzle 70. The nozzle body 76 includes an external surface 78. The manifold passage 74 extends through the nozzle body 76 to at least one open end (e.g., an end of the manifold passage 74 formed through a portion of the external surface 78).

The nozzle orifice 72 of FIG. 3 extends through the nozzle body 76 between and to a nozzle inlet 80 and a nozzle outlet 82. The nozzle inlet 80 is disposed at (e.g., on, adjacent, or proximate) the manifold passage 74, such that the nozzle orifice 72 is in fluid communication with the manifold passage 74. The nozzle outlet 82 is disposed at (e.g., on, adjacent, or proximate) the external surface 78. As shown in FIG. 3, the nozzle orifice 72 may extend substantially orthogonally relative to the manifold passage 74. However, the nozzle orifice 72 of the present disclosure is not limited to any particular orientation relative to the manifold passage 74. The nozzle body 76 forms a rounded shape at (e.g., on, adjacent, or proximate) the nozzle inlet 80. For example, the nozzle body 76 of FIG. 3 includes a fillet 84 forming the nozzle inlet 80. The rounded shape (e.g., the fillet 84) extends circumferentially about (e.g., completely around) the nozzle inlet 80.

The rounded shape of the nozzle body 76 at the nozzle inlet 80 may facilitate a reduction in fluid cavitation relative to a nozzle inlet which may be formed by an edge (e.g., a sharp edge formed by an interface between two nozzle body surfaces) of a nozzle body at an interface between a nozzle orifice and a manifold passage. Cavitation of fluid (e.g., a lubricant) flowing through a nozzle may cause the formation and subsequent collapse of fluid vapor bubbles, which formation and subsequent collapse may induce instability of the fluid jet exiting the nozzle. For example, cavitation of fluid flowing through a nozzle may cause or increase the likelihood of earlier fluid jet (e.g., the fluid exiting the nozzle) breakup and/or increased brooming angles of the fluid jet. In contrast, the rounded shape of the nozzle body 76 at the nozzle inlet 80 may prevent or reduce fluid cavitation and facilitate improved fluid jet consistency and targeting, for example, by causing an increase in the fluid pressure at which fluid cavitation becomes significant. The rounded shape of the nozzle body 76 at the nozzle inlet 80 may also facilitate, for example, a same fluid flow rate with a lower nozzle inlet 80 fluid pressure relative to a nozzle inlet having a same diameter, but which may be formed by an edge. A shape, curvature, and/or other configuration of the rounded shape of the nozzle body 76 at the nozzle inlet 80 may be optimized using computational fluid dynamics (CFD) analysis to reduce the likelihood of fluid cavitation, improve fluid jet characteristics, and improve fluid flow through the nozzle orifice 72.

However, we have found that at least some conventional practices for forming the rounded shape for a nozzle inlet (e.g., the nozzle inlet 80) may involve complex machining, assembly, or other manufacturing processes. Because a gas turbine engine (e.g., the gas turbine engine 10) or other rotational equipment assembly may include hundreds of fluid nozzles, these conventional practices can contribute significantly to the expense and time associated with manufacturing the associated gas turbine engine or other rotational equipment assembly. Further, at least some conventional practices for forming the rounded shape for a nozzle inlet may include installing (e.g., welding) a pre-fabricated nozzle inlet inside a nozzle body, thereby increasing manufacturing complexity and/or the weight of the resultant nozzle.

Figure 4:
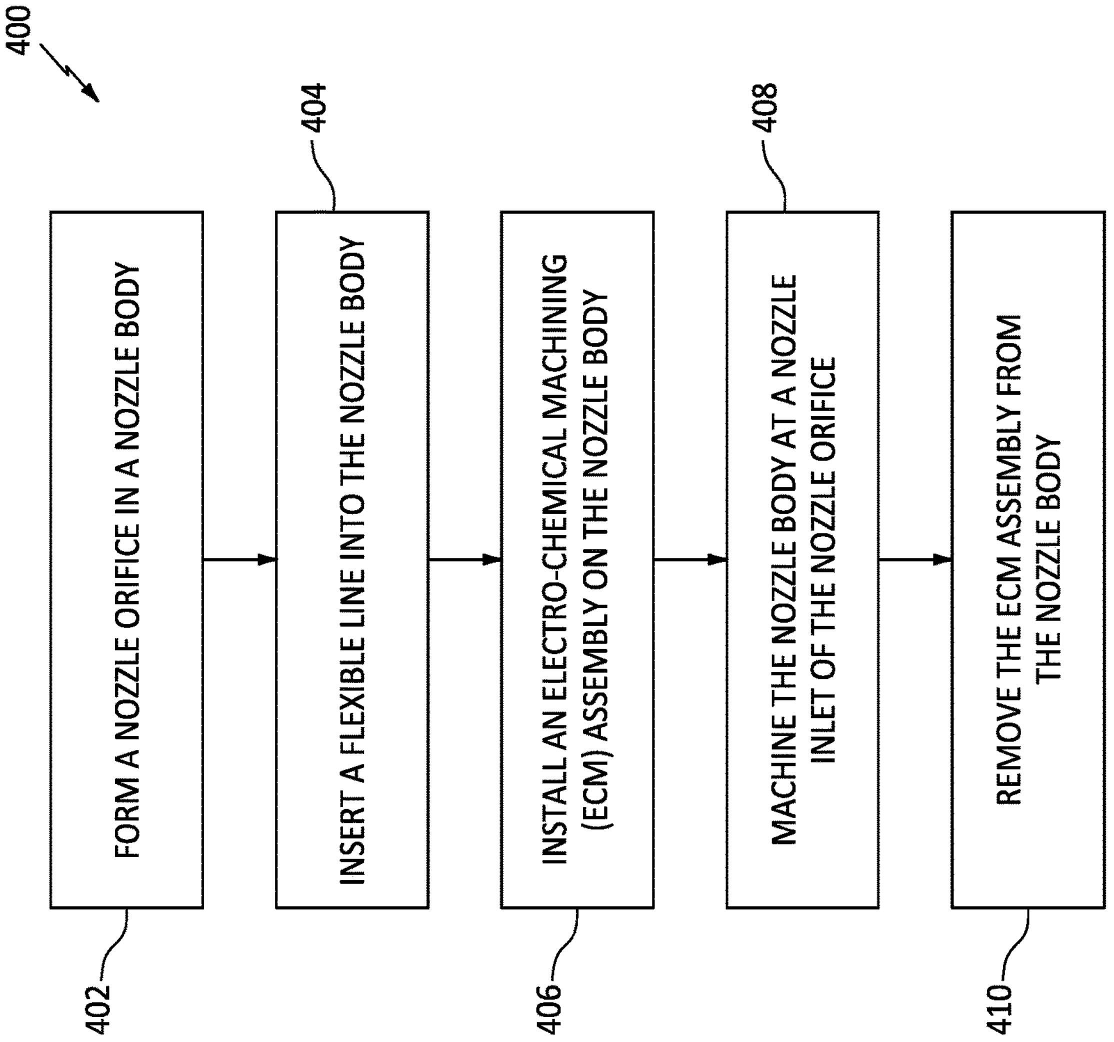
FIG. 4 illustrates a block diagram of a method for forming a nozzle inlet of a nozzle, in accordance with one or more embodiments of the present disclosure.

Referring to FIG. 4, a Method 400 for forming a nozzle inlet of a nozzle is provided. FIG. 4 illustrates a flowchart for the Method 400. The Method 400 may be performed, for example, to form the nozzle 70 of FIG. 3. However, while aspects of the Method 400 may be described herein with respect to the nozzle 70, the present disclosure Method 400 is not limited to forming the nozzle 70 configuration of FIG. 3. Unless otherwise noted herein, it should be understood that the steps of Method 400 are not required to be performed in the specific sequence in which they are discussed below and, in some embodiments, the steps of Method 400 may be performed separately or simultaneously.

Figure 5:
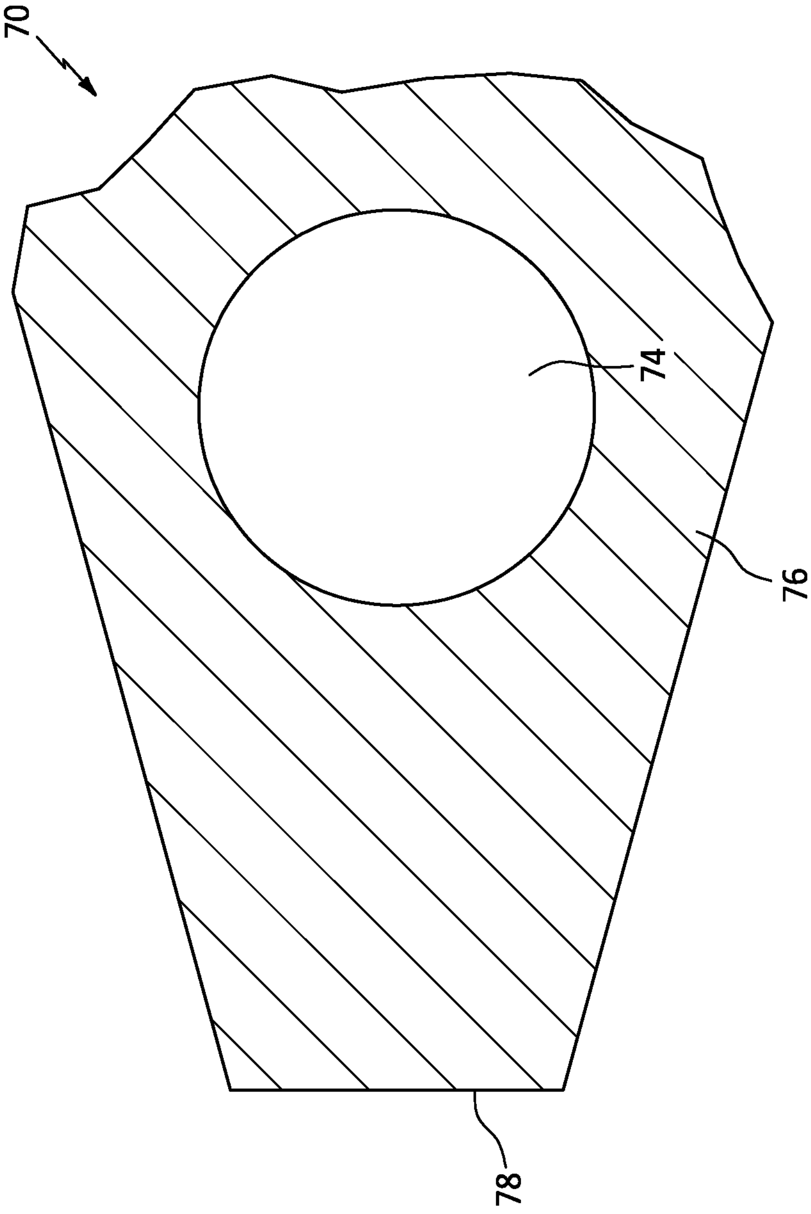
FIG. 5 illustrates a side, cutaway view of the nozzle at a stage of the method of FIG. 4, in accordance with one or more embodiments of the present disclosure.
Figure 6:
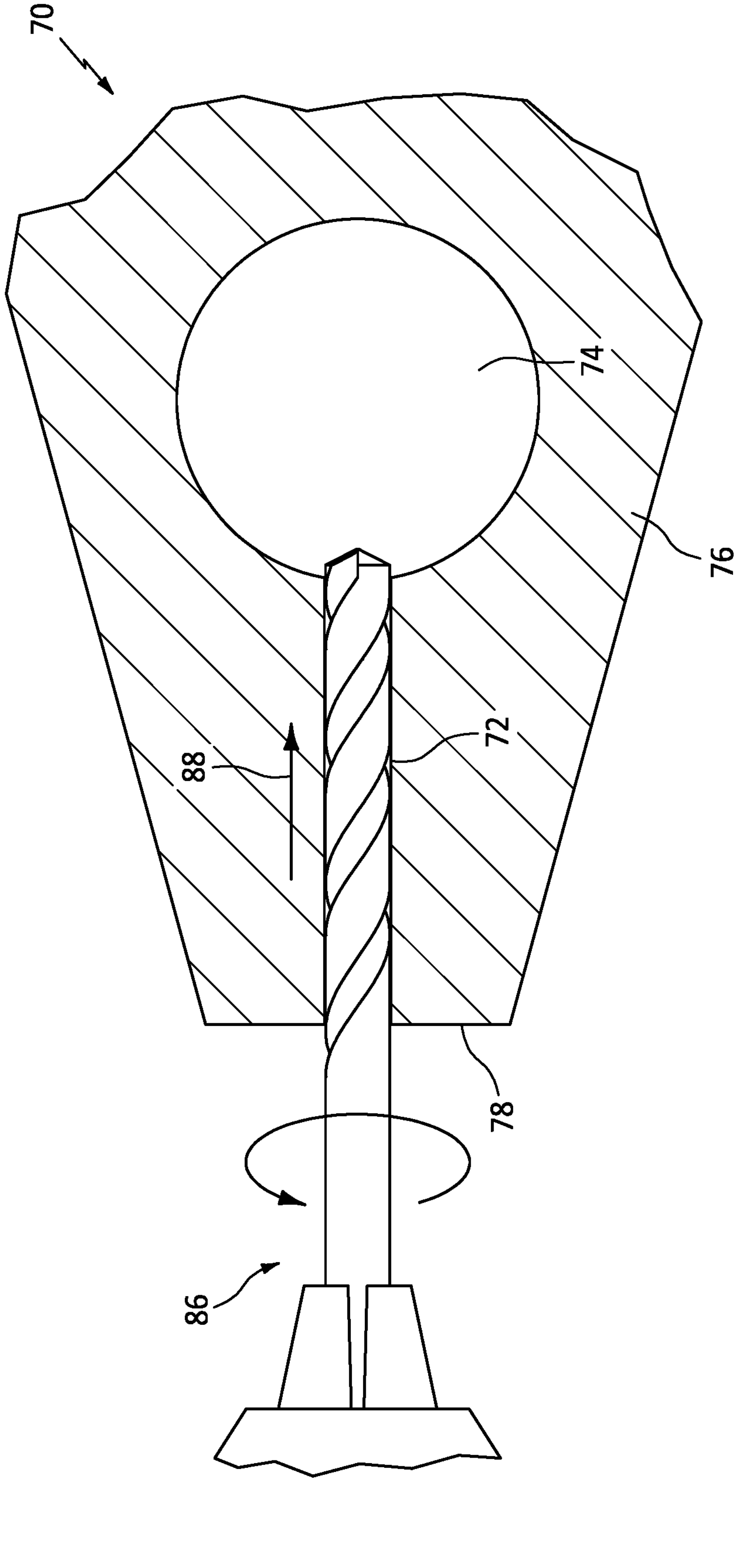
FIG. 6 illustrates a side, cutaway view of the nozzle at another stage of the method of FIG. 4, in accordance with one or more embodiments of the present disclosure.

Step 402 includes forming the nozzle orifice 72 in the nozzle body 76. FIG. 5 illustrates the nozzle body 76 in a condition prior to forming the nozzle orifice 72. FIG. 6 illustrates an exemplary process for forming the nozzle orifice 72. As shown in FIG. 6, the nozzle orifice 72 may be formed in the nozzle body 76 using a drill 86. For example, the drill 86 (e.g., a drill bit) may be inserted into the nozzle body 76 in an insertion direction 88 to form the nozzle orifice 72 from the external surface 78 to the manifold passage 74.

Figure 7:
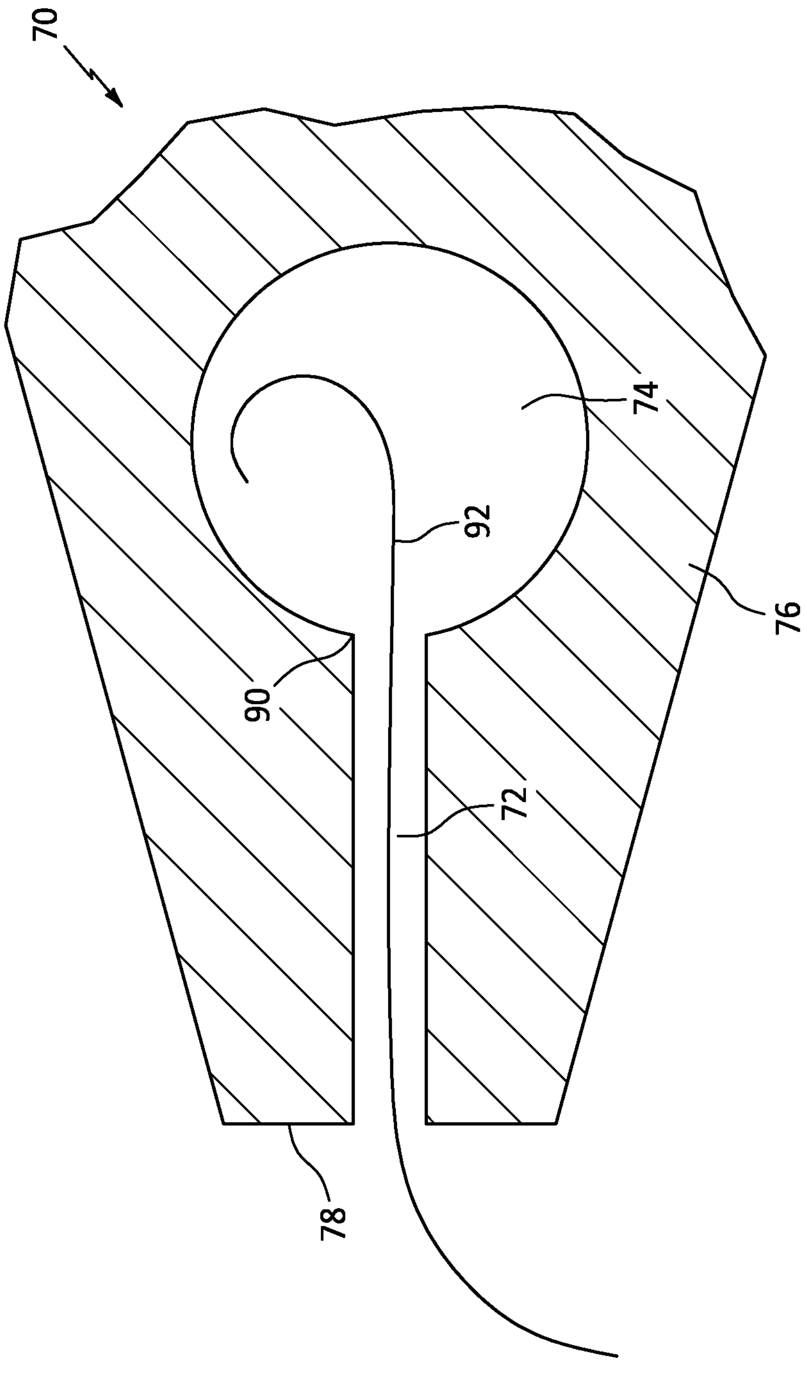
FIG. 7 illustrates a side, cutaway view of the nozzle at another stage of the method of FIG. 4, in accordance with one or more embodiments of the present disclosure.

FIG. 7 illustrates the nozzle body 76 subsequent to formation of the nozzle orifice 72 in Step 402. The nozzle body 76 of FIG. 7 includes an edge 90 at (e.g., on, adjacent, or proximate) the nozzle inlet 80, the edge 90 being formed by the nozzle body 76 at an interface between the manifold passage 74 and the nozzle orifice 72. The edge 90 may extend circumferentially about (e.g., completely around) the nozzle orifice 72 at the nozzle inlet 80.

Step 404 includes inserting a flexible line 92 (e.g., string, cord, wire, cable, etc.) into the nozzle body 76. For example, the flexible line 92 may be configured as a high-tensile and thin line such as, but not limited to a fishing line. The flexible line 92 may include or otherwise be formed by a polymeric material (e.g., nylon, polyethylene, or polyvinylidene fluoride), however, the present disclosure is not limited to any particular material for the flexible line 92. The flexible line 92 may be inserted into the nozzle body 76 through the nozzle outlet 82. The flexible line 92 may then be threaded into and through the nozzle body 76 and its nozzle orifice 72 and manifold passage 74. The flexible line 92 may be threaded into and through the nozzle body 76 until a leading end of the flexible line 92 can be withdrawn from an open end of the manifold passage 74.

Figure 8:
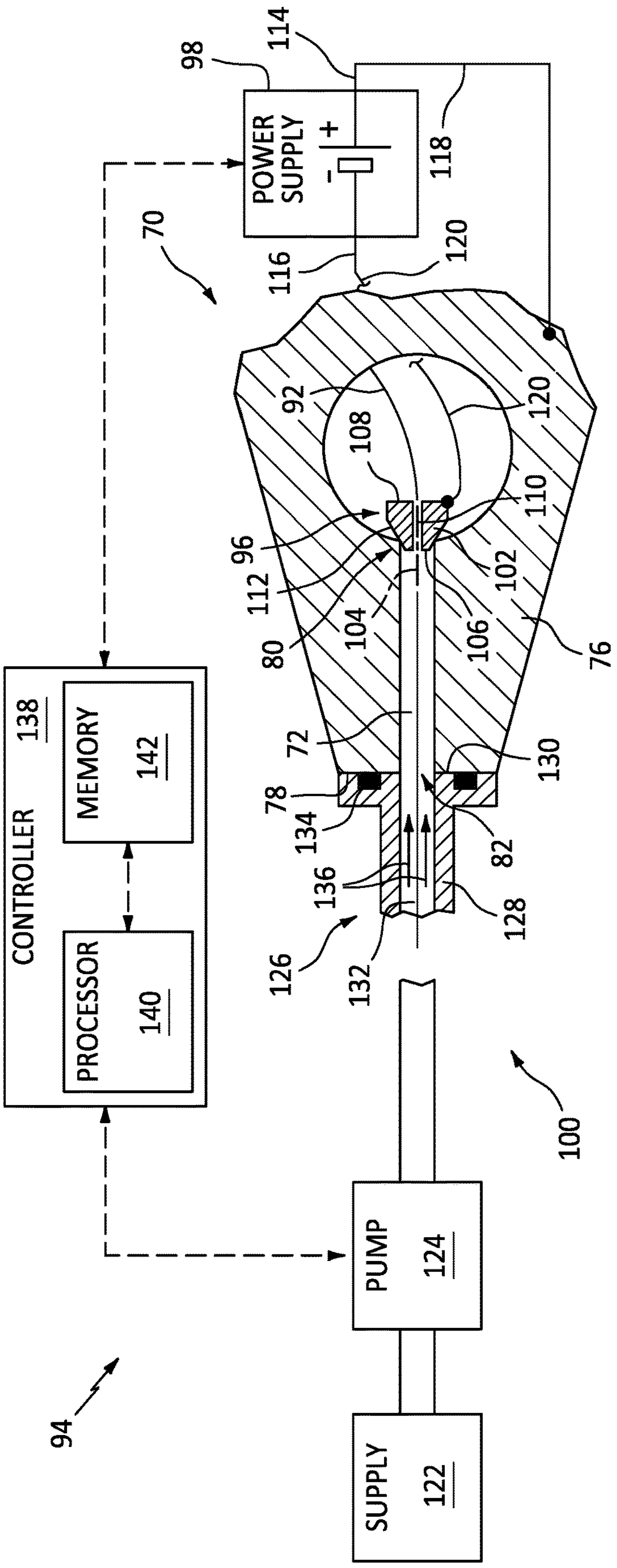
FIG. 8 illustrates a side, cutaway view of the nozzle at another stage of the method of FIG. 4, in accordance with one or more embodiments of the present disclosure.

Step 406 includes installing an electro-chemical machining (ECM) assembly 94 on the nozzle body 76. FIG. 8 illustrates an exemplary configuration of the ECM assembly 94 installed on the nozzle body 76. The ECM assembly 94 of FIG. 8 includes a machining tool 96, a power supply 98, and an electrolyte (e.g., an electrically conductive fluid) supply assembly 100.

The machining tool 96 of FIG. 8 includes a tool body 102. The tool body 102 may include or otherwise be formed by an electrically-conductive material such as, but not limited to, a metallic material (e.g., copper). The tool body 102 may extend circumferentially about (e.g., completely around) a tool axis 104. The tool body 102 may extend between and to a first axial end 106 of the tool body 102 and a second axial end 108 of the tool body 102, relative to the tool axis 104. The tool body 102 may form a center passage 110 extending along the tool axis 104 from the first axial end 106 to the second axial end 108. The tool body 102 includes a tapered shape 112 at (e.g., on, adjacent, or proximate) the first axial end 106. The tapered profile 112 may be formed by a gradual increase in a diameter from the tool body 102 from the first axial end 106 toward the second axial end 108. For example, the tapered profile 112 may form a conical shape, a conical frustrum shape, or another tapered shape at (e.g., on, adjacent, or proximate) the first axial end 106. A shape of the tapered profile 112 may be selected based on a desired configuration of the rounded shape (e.g., the fillet 84, see FIG. 3) of the nozzle body 76 at the nozzle inlet 80. The machining tool 96 may be fixedly attached to the flexible line 92. The flexible line 92 may pass through the center passage 110 and may be fixedly attached or otherwise engaged with the machining tool 96 with any suitable interface configuration. The present disclosure is not limited to any particular interface configuration between the machining tool 96 and the flexible line 92, provided the machining tool 96 can be securely attached to the flexible line 92.

The power supply 98 may be disposed outside the nozzle body 76 as shown, for example, in FIG. 8. The power supply 98 may be configured as a direct current (DC) power supply including a positive terminal 114 and a negative terminal 116. The positive terminal 114 may be in electrical communication with the nozzle body 76. For example, the positive terminal 114 may be electrically connected to the nozzle body 76 by a wire 118 (e.g., an insulated wire) connected to the positive terminal 114 and the nozzle body 76. The negative terminal 116 may be in electrical communication with the tool body 102. For example, the negative terminal 116 may be electrically connected to the tool body 102 by a wire 120 (e.g., an insulated wire) connected to the negative terminal 116 and the tool body 102.

The electrolyte supply assembly 100 of FIG. 8 includes an electrolyte supply 122, an electrolyte pump 124, and an electrolyte nozzle 126. The electrolyte supply 122 may be configured as a fluid tank, container, or other suitable apparatus for storing an electrolyte. The stored electrolyte may include any suitable electrolyte for an ECM process such as, but not limited to, sodium hydroxide, potassium hydroxide, sodium chloride, sodium nitrate, or the like. The electrolyte pump 124 is in fluid communication with the electrolyte supply 122 and the electrolyte nozzle 126, for example, using one or more suitable fluid conduits (e.g., tubes, pipes, etc.). The electrolyte pump 124 is configured to draw the electrolyte from the electrolyte supply 122 and direct the electrolyte to the electrolyte nozzle 126. The electrolyte nozzle 126 includes a nozzle body 128. The nozzle body 128 includes a mating end 130 configured to engage the external surface 78 at (e.g., on, adjacent, or proximate) the nozzle outlet 82. The nozzle body 128 forms an electrolyte orifice 132 extending through the mating end 130. The electrolyte orifice 132 is in fluid communication with the electrolyte pump 124. The electrolyte orifice 132 is configured to receive the electrolyte from the electrolyte pump 124 and direct the electrolyte into the nozzle orifice 72. The electrolyte nozzle 126 may include a seal ring 134 disposed at (e.g., on, adjacent, or proximate) the mating end 130. The seal ring 134 may be disposed circumferentially about (e.g., completely around) the electrolyte orifice 132. The seal ring 134 may be configured to sealingly engage the external surface 78 to form a fluid seal between the electrolyte nozzle 126 (e.g., the mating end 130) and the external surface 78.

Step 406 may include connecting, attaching, or otherwise engaging the flexible line 92 and the wire 120 with the machining tool 96. Subsequently, the flexible line 92 may be pulled through the nozzle body 76 such that the flexible line 92 is withdrawn from the nozzle outlet 82. The flexible line 92 may be pulled through the nozzle body 76 until the machining tool 96 (e.g., the tapered profile 112) is engaged with the nozzle body 76 or otherwise positioned at (e.g., on, adjacent, or proximate) the nozzle inlet 80 (e.g., at the edge 90), as shown in FIG. 8. The flexible line 92 may extend into and through the electrolyte orifice 132 or may be otherwise engaged with the electrolyte nozzle 126. The flexible line 92 may be secured in a taut condition (e.g., fixed to the electrolyte nozzle 126 and/or another component of the electrolyte supply assembly 100) in order to maintain the machining tool 96 in contact with or positioned proximate the nozzle body 76 at the nozzle inlet 80. For example, the flexible line 92 tension may be sufficient to facilitate contact between the machining tool 96 and the nozzle body 76 with no electrolyte flow through the nozzle orifice 72. The flexible line 92 tension may also be sufficient to maintain the position of the machining tool 96 proximate the nozzle inlet 80 with electrolyte flow through the nozzle orifice 72. Step 406 may also include installing the electrolyte supply assembly 100 on the nozzle body 76 so that the electrolyte orifice 132 is positioned at (e.g., on, adjacent, or proximate) and in fluid communication with the nozzle outlet 82.

Step 408 includes machining the nozzle body 76 with the ECM assembly 94 at (e.g., on, adjacent, or proximate) the nozzle inlet 80 to form the fillet 84 or other rounded shape (e.g., to remove the edge 90) of the nozzle body 76 at (e.g., on, adjacent, or proximate) the nozzle inlet 80. The power supply 98 is energized and the electrolyte (schematically illustrated in FIG. 8 as electrolyte 136) is directed by the electrolyte pump 124 through the electrolyte nozzle 126, the nozzle orifice 72 and the manifold passage 74. An electrical current (e.g., a DC current) from the power supply 98 flows through the positively-charged nozzle body 76 (e.g., an anode), the conductive electrolyte 136, and the negatively-charged tool body 102 (e.g., a cathode). The flow of electrolyte 136 may flow through the tool body 102 (e.g., through the center passage 110) as well as between the tool body 102 and the nozzle body 76. The flow of the electrolyte 136 through the nozzle inlet 80 may cause a small gap (e.g., 80-800 micrometers) to be formed between the nozzle body 76 and the tool body 102 at (e.g., on, adjacent, or proximate) the nozzle inlet 80. As electrons (e.g., the DC current) cross the gap from the nozzle body 76 to the tool body 102, material of the nozzle body 76 at (e.g., on, adjacent, or proximate) the nozzle inlet 80 or otherwise proximate the tool body 102 may be dissolved. The dissolved material (e.g., metal hydroxide ions) of the nozzle body 76 may bond with or otherwise be carried away from the nozzle inlet 80 by the flowing electrolyte 136. The removal of the nozzle body 76 material forms the fillet 84 at (e.g., on, adjacent, or proximate) the nozzle inlet 80. Formation of the fillet 84 may, thereby, be accomplished with a high degree of precision and with a mirror-quality or substantially mirror quality surface finish of the nozzle body 76 at (e.g., on, adjacent, or proximate) the nozzle inlet 80. The fillet 84 formed by the ECM process of Step 408 can be seen, for example, from the nozzle 70 of FIG. 3.

During the ECM process of Step 408, an electrical resistance between the nozzle body 76 and the tool body 102 may decrease due to the removal of nozzle body 76 material. As a result, the electrical current (e.g., a DC current) flow from the power supply 98 may gradually increase over the course of the ECM process. A predetermined electrical current value may be used to identify that the ECM process of Step 408 for forming the fillet 84 is complete. For example, the ECM process of Step 408 may be identified as complete when a measured value of the electrical current reaches or exceeds a predetermined electrical current threshold value.

Step 410 includes removing the ECM assembly 94 from the nozzle body 76. The power supply 98 and the electrolyte pump 124 may be deenergized. The electrolyte nozzle 126 may be removed or otherwise disconnected from the nozzle body 76. The flexible line 92 may be withdrawn from the nozzle body 76 through the open end of the manifold passage 74, thereby removing the machining tool 96 and the 120 from the nozzle body 76.

In some embodiments, the ECM assembly 94 may include a controller 138. The controller 138 may be in communication (e.g., signal communication) with one or more components of the ECM assembly 94 such as, but not limited to, the electrolyte supply assembly 100 and/or the power supply 98. The controller 138 of FIG. 8 includes a processor 140 and memory 142. The memory 142 is in signal communication with the processor 140. The processor 140 may include any type of computing device, computational circuit, or any type of process or processing circuit capable of executing a series of instructions that are stored in the memory 142, thereby causing the processor 140 to perform or control one or more steps or other processes. The processor 140 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 142 may represent one or more algorithms for controlling aspects of the ECM assembly 94, and the stored instructions are not limited to any particular form (e.g., program files, system data, buffers, drivers, utilities, system programs, etc.) provided they can be executed by the processor 140. The memory 142 may be a non-transitory computer readable storage medium configured to store instructions that when executed by one or more processors, cause the one or more processors to perform or cause the performance of certain functions. The memory 142 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 138 may be achieved via the use of hardware, software, firmware, or any combination thereof. The controller 138 may also include input and output devices (e.g., keyboards, buttons, switches, touch screens, video monitors, sensor readouts, data ports, etc.) that enable the operator to input instructions, receive data, etc.

The controller 138 may be configured to execute or control one or more steps of the Method 400. For example, the processor 140 may execute instructions stored in memory 142, thereby causing the controller 138 and/or its processor 140 to execute or otherwise control one or more steps of the Method 400. The controller 138 may control one or more aspects of the operation of the ECM assembly 94. For example, the controller 138 may be configured to monitor (e.g., using one or more sensors) and control operational parameters of the ECM assembly 94 such as, but not limited to electrolyte temperature, electrolyte flow rate (e.g., by controlling electrolyte pump 124 speed), electrical voltage (e.g., DC voltage of the power supply 98), and/or electrical current (e.g., DC current supplied by the power supply 98). The controller 138 may identify a completion status for the ECM process of Step 408 by comparing a measured value of the electrical current from the power supply 98 to a predetermined electrical current threshold value. When the measured value of the electrical current reaches or exceeds the predetermined electrical current threshold value, the controller 138 may deenergize the power supply 98 and/or the electrolyte pump 124.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A method for forming a nozzle inlet of a nozzle, the method comprising:

providing a nozzle body including an external surface, the nozzle body forming a manifold passage;

forming a nozzle aperture extending through the nozzle body between and to a nozzle inlet and a nozzle outlet, the nozzle inlet disposed at the manifold passage, the nozzle outlet disposed at the external surface, forming the nozzle aperture including forming an edge of the nozzle body at the nozzle inlet;

positioning a machining tool of an electro-chemical machining (ECM) assembly in contact with the nozzle body at the nozzle inlet by attaching the machining tool to a flexible line and pulling the flexible line through the nozzle aperture to position the machining tool at the nozzle inlet; and with the machining tool positioned in contact with the nozzle body at the nozzle inlet, forming the nozzle inlet by removing the edge with the machining tool and forming a fillet of the nozzle body at the nozzle inlet, the fillet extending circumferentially about the nozzle inlet.

2. The method of claim 1, wherein forming the nozzle inlet includes:

directing an electrolyte through the nozzle inlet; and applying an electrical current through the nozzle body, the electrolyte, and the machining tool while directing the electrolyte through the nozzle inlet.

3. The method of claim 2, wherein forming the nozzle inlet further includes directing the electrolyte through the nozzle inlet and applying the electrical current until the electrical current exceeds a predetermined electrical current threshold value.

4. The method of claim 1, wherein positioning the machining tool includes inserting the flexible line into an open end of the manifold passage after attaching the machining tool to the flexible line and before pulling the flexible line through the nozzle aperture.

5. The method of claim 1, wherein forming the nozzle aperture includes drilling the nozzle aperture through the nozzle body in a direction from the nozzle outlet to the nozzle inlet.

6. The method of claim 1, wherein the edge is arranged at an interface between the manifold passage and the nozzle inlet.

7. The method of claim 1, wherein the nozzle aperture is formed orthogonal to the manifold passage.

8. The method of claim 1, wherein the edge extends circumferentially about the nozzle aperture at the nozzle inlet.

9. The method of claim 1, wherein the nozzle inlet is located within an interior of the nozzle body.

10. The method of claim 1, wherein positioning the machining tool further includes inserting the flexible line through the nozzle outlet and threading the flexible line through the nozzle aperture and the manifold passage until a leading end of the flexible line is withdrawn from an open end of the manifold passage.

11. The method of claim 1, wherein the machining tool includes a tool body forming a center passage extending through the tool body, and the flexible line passes through the center passage.

12. The method of claim 11, wherein the tool body includes a tapered profile at a first end of the tool body, and pulling the flexible line positions the tapered profile at the nozzle inlet.

13. The method of claim 12, wherein the tapered profile is conical or conical-frustum shaped.

14. The method of claim 1, wherein pulling the flexible line includes pulling the flexible line until the machining tool is engaged with the nozzle body at the nozzle inlet.

15. The method of claim 1, further comprising securing the flexible line in a taut condition to maintain the machining tool in contact with or positioned proximate the nozzle body at the nozzle inlet during forming of the nozzle inlet.

16. The method of claim 1, further comprising installing an electrolyte nozzle on the nozzle body at the nozzle outlet, wherein the flexible line extends through the electrolyte nozzle.

17. The method of claim 16, wherein the electrolyte nozzle includes a mating end engaged with the external surface at the nozzle outlet and a seal ring disposed circumferentially about an electrolyte aperture of the electrolyte nozzle, the seal ring sealingly engaging the external surface to form a fluid seal.

* * * * *